United States Patent
Kondo et al.

(10) Patent No.: US 10,637,261 B2
(45) Date of Patent: Apr. 28, 2020

(54) PROTECTION CIRCUIT AND BATTERY PACK OF LITHIUM-ION SECONDARY BATTERY

(71) Applicant: YAMAHA HATSUDOKI KABUSHIKI KAISHA, Iwata-shi, Shizuoka (JP)

(72) Inventors: Mitsuo Kondo, Iwata (JP); Ryo Saito, Iwata (JP)

(73) Assignee: YAMAHA HATSUDOKI KABUSHIKI KAISHA, Iwata-Shi, Shizuoka (JP)

(*) Notice: Subject to any disclaimer, the term of this patent is extended or adjusted under 35 U.S.C. 154(b) by 72 days.

(21) Appl. No.: 15/988,347

(22) Filed: May 24, 2018

(65) Prior Publication Data
US 2018/0269698 A1  Sep. 20, 2018

Related U.S. Application Data

(63) Continuation-in-part of application No. PCT/JP2016/081725, filed on Oct. 26, 2016.

(30) Foreign Application Priority Data

Nov. 25, 2015 (JP) .................. 2015-229602

(51) Int. Cl.
*H02J 7/00* (2006.01)
*H01M 10/42* (2006.01)
(Continued)

(52) U.S. Cl.
CPC .............. *H02J 7/0029* (2013.01); *H01M 2/34* (2013.01); *H01M 10/425* (2013.01); *H02H 7/18* (2013.01);
(Continued)

(58) Field of Classification Search
CPC ...................................... H02J 7/0031
(Continued)

(56) References Cited

U.S. PATENT DOCUMENTS 6,331,763 B1 * 12/2001 Thomas ................. H02H 9/042
                                                                320/136
7,514,903 B2 * 4/2009 Lee ....................... H02J 7/0031
                                                                320/112
(Continued)

FOREIGN PATENT DOCUMENTS

CN        101039038 A      9/2007
CN        101572326 A      11/2009
(Continued)

*Primary Examiner* — Edward Tso
*Assistant Examiner* — Ahmed H Omar
(74) *Attorney, Agent, or Firm* — Rabin & Berdo, P.C.

(57) ABSTRACT

Provided is a protection circuit of a lithium-ion secondary battery that, when reaching overdischarging, can suppress any more progress of the overdischarging with a versatile approach and at low costs. A protection circuit of a lithium-ion secondary battery includes: a controlling IC that is driven by electric power of the lithium-ion secondary battery, and configured to detect at least a voltage of the lithium-ion secondary battery; and an interrupting circuit including at least a fuse and a switch, the fuse being arranged between the lithium-ion secondary battery and the controlling IC, the switch being arranged so as to allow a current capable of blowing the fuse to flow from the lithium-ion secondary battery to the fuse when the switch is turned on.

8 Claims, 9 Drawing Sheets

(51) Int. Cl.
- H02H 7/18 (2006.01)
- H01M 2/34 (2006.01)
- *H01M 10/44* (2006.01)
- *H01M 10/48* (2006.01)
- *H01M 10/0525* (2010.01)

(52) U.S. Cl.
CPC ....... H02J 7/0031 (2013.01); *H01M 10/0525* (2013.01); *H01M 10/44* (2013.01); *H01M 10/48* (2013.01); *H01M 2200/00* (2013.01); *H01M 2200/103* (2013.01); *H02J 7/00302* (2020.01); *H02J 7/00306* (2020.01)

(58) Field of Classification Search
USPC .................................................. 320/134, 136
See application file for complete search history.

(56) References Cited

U.S. PATENT DOCUMENTS

| | | | |
|---|---|---|---|
| 2008/0166627 A1 | 7/2008 | Mori et al. | |
| 2009/0002908 A1* | 1/2009 | Chiang | H02H 7/16 361/104 |
| 2009/0273314 A1 | 11/2009 | Yoshikawa | |
| 2011/0019326 A1 | 1/2011 | Odaohhara | |
| 2011/0299209 A1 | 12/2011 | Tajima et al. | |
| 2012/0225328 A1 | 9/2012 | Nakanouchi et al. | |
| 2013/0229144 A1 | 9/2013 | Nagata et al. | |
| 2013/0229151 A1 | 9/2013 | Okada et al. | |
| 2016/0226288 A1* | 8/2016 | Kuroda | H02J 7/0081 |

FOREIGN PATENT DOCUMENTS

| | | |
|---|---|---|
| CN | 102270830 A | 12/2011 |
| JP | S57-021228 U | 2/1982 |
| JP | H07-241040 A | 9/1995 |
| JP | 2006-109596 A | 4/2006 |
| JP | 2007-250205 A | 9/2007 |
| JP | 2009-273208 A | 11/2009 |
| JP | 2011-023317 A | 2/2011 |
| JP | 2011-101449 A | 5/2011 |
| JP | 2011-115012 A | 6/2011 |
| JP | 2011-254658 A | 12/2011 |
| TW | 2004-15812 A | 8/2004 |
| TW | 2004-15833 A | 8/2004 |
| TW | 2015-39916 A | 10/2015 |
| WO | WO-2015/033563 A1 | 3/2015 |
| WO | WO-2015/037266 A1 | 3/2015 |

\* cited by examiner

PROTECTION CIRCUIT AND BATTERY PACK OF LITHIUM-ION SECONDARY BATTERY

CROSS-REFERENCE TO RELATED APPLICATIONS

This application is a continuation-in-part application of International Application PCT/JP2016/081725 filed on Oct. 26, 2016, which claims priority to Japanese Patent Application No. 2015-229602, filed on Nov. 25, 2015, the entire contents of which are incorporated herein by reference.

TECHNICAL FIELD

The present teaching relates to a protection circuit and a battery pack of a lithium-ion secondary battery.

BACKGROUND ART

A lithium-ion secondary battery is generally used with a protection circuit. Examples of main functions of the protection circuit for the lithium-ion secondary battery include controlling the lithium-ion secondary battery such that the lithium-ion secondary battery can be used under safe conditions, and preventing the lithium-ion secondary battery from being used if the lithium-ion secondary battery is no longer under safe conditions. To achieve these functions, the protection circuit of the lithium-ion secondary battery needs to be configured to safely stop functions of the lithium-ion secondary battery if the lithium-ion secondary battery is brought into a state that is out of its normal usage range (for example, an overcharge state or an overdischarge state).

Patent Literature 1 (PTL 1) discloses a protection circuit of a lithium-ion secondary battery. FIG. 9 shows an example of the protection circuit disclosed in Patent Literature 1. A protection circuit 100 shown in FIG. 9 includes a protection element 50, a detection-purpose IC 63, and an FET 61. The protection circuit 100 is connected to a battery pack 70 of a lithium-ion secondary battery. The battery pack 70 has a plurality of series-connected cells 71. The protection element 50, which is a fuse with a heating element, includes a heating resistor 53 and fuse elements 56. The protection element 50 is configured such that the fuse elements 56 are blown by heat that the heating resistor 53 generates when the heating resistor 53 is electrically conducted. The detection-purpose IC 63 is configured to detect a voltage across both ends of each cell 71. The detection-purpose IC 63 is configured to detect a voltage across both ends of the battery pack 70, and output a signal according to a detection result to a gate of the FET 61. When an overcurrent occurs in the battery pack 70, the fuse elements 56 are blown due to the overcurrent. When an overvoltage occurs in the battery pack 70, the voltage level of a detection signal outputted from the detection-purpose IC 63 is raised. As a result, the gate potential of the FET 61 rises, to bring the FET 61 into a switch-on state. A current flows between drain and source of the FET 61. A current flows in the heating resistor 53, so that the heating resistor 53 generates heat. As a consequence, the fuse elements 56 are blown. In this manner, the protection circuit 100 shown in FIG. 9 protects the lithium-ion secondary battery from overcharging.

Patent Literature 2 (PTL 2) discloses a protection circuit of a lithium-ion secondary battery. In the protection circuit shown in Patent Literature 2, a battery voltage is compared against a threshold value which is a recharging prevention voltage. This way, whether or not the battery voltage has reached a deep discharge region is determined. Patent Literature 2 discloses that recharging of a battery pack is disabled upon determination that the battery voltage has reached the deep discharge region.

CITATION LIST

Patent Literature

PTL 1: Japanese Patent Application Laid-Open No. 2006-109596
PTL 2: Japanese Patent Application Laid-Open No. 2011-115012

SUMMARY OF INVENTION

Technical Problem

The protection circuit of Patent Literature 1 is effective in protecting the lithium-ion secondary battery from overcharging. The protection circuit of Patent Literature 1, however, is insufficient in protecting the lithium-ion secondary battery from overdischarging. This is because the protection circuit of Patent Literature 1 faces a problem that even though the fuse elements 56 are blown, the detection-purpose IC 63 continues to consume the current so that overdischarging progresses. Patent Literature 2 discloses that recharging of the battery pack is disabled, but contains no disclosure about specific means therefor.

The teaching of the present application provides a protection circuit of a lithium-ion secondary battery that, when reaching overdischarging, can suppress any more progress of the overdischarging with a versatile approach and at low costs.

Solution to Problem

A protection circuit of a lithium-ion secondary battery according to the present teaching includes:

a controlling IC that is driven by electric power of the lithium-ion secondary battery, and configured to detect at least a voltage of the lithium-ion secondary battery; and an interrupting circuit including at least a fuse and a switch, the fuse being arranged between the lithium-ion secondary battery and the controlling IC, the switch being arranged so as to allow a current capable of blowing the fuse to flow from the lithium-ion secondary battery to the fuse when the switch is turned on.

In the protection circuit of the present teaching, if an abnormality such as overdischarging occurs in the lithium-ion secondary battery, the switch is turned on so that a current having a magnitude capable of blowing the fuse flows from the lithium-ion secondary battery to the fuse. As a result, the fuse is blown, and thus current consumption of the controlling IC stops. Accordingly, when overdischarging is reached, any more progress of the overdischarging can be suppressed. The fuse with the heating element disclosed in Patent Literature 1 is a component for cutting a main circuit. If such a fuse with a heating element is applied for the purpose of cutting a circuit with a low current consumption, a risk of over-engineering and high costs occurs. In this respect, the protection circuit of the present teaching, in which a versatile component with a low current consumption is adoptable as the fuse and the switch, can suppress a progress of overdischarging at low costs.

Advantageous Effects of Invention

The teaching of the present application, when overdischarging is reached, can suppress any more progress of the overdischarging with a versatile approach and at low costs.

DESCRIPTION OF EMBODIMENTS

Figure 1:
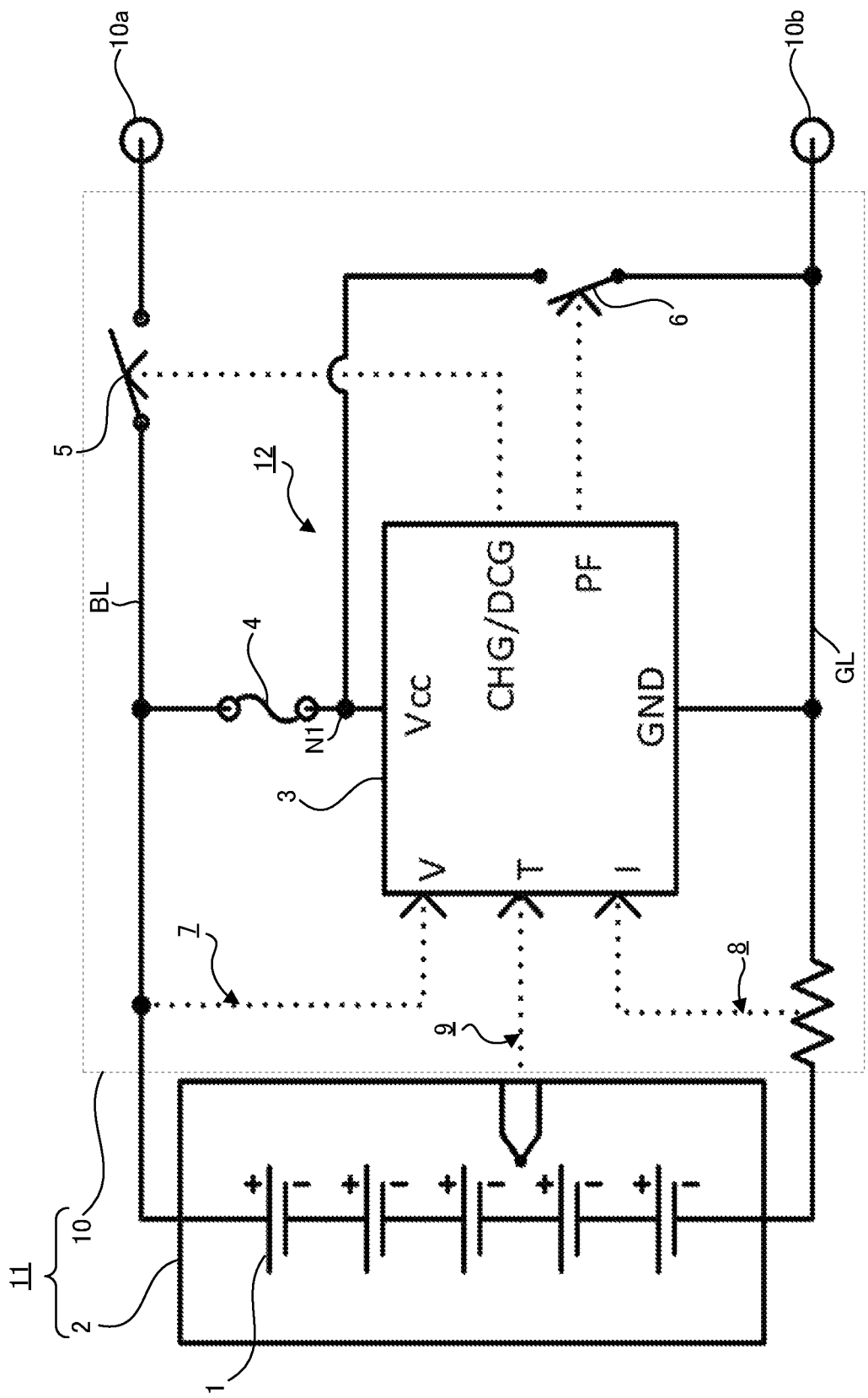
FIG. 1 A circuit diagram schematically showing an example of a protection circuit according to the teaching of the present application.

FIG. 1 is a circuit diagram schematically showing an example of a protection circuit according to the teaching of the present application.

A protection circuit 10 shown in FIG. 1 cooperates with a module 2 (lithium-ion secondary battery module) to form a battery pack 11 (lithium-ion secondary battery pack). In other words, the battery pack 11 includes the protection circuit 10 and the module 2. The battery pack 11 has a positive terminal 10a and a negative terminal 10b. The positive terminal 10a and the negative terminal 10b are connected to an external load or a recharger, for example.

The module 2 has a plurality of cells 1 (lithium-ion secondary battery cells). The number of cells 1 is not particularly limited. The plurality of cells 1 are connected in series, in parallel, or in combination of series and parallel. The number of modules 2 is not particularly limited. In a case where a plurality of modules 2 are provided, the number of the plurality of modules 2 is not particularly limited. The plurality of modules 2 are connected in series, in parallel, or in combination of series and parallel. The cell 1 is one example of the "lithium-ion secondary battery" of the present teaching. The module 2 is one example of the "lithium-ion secondary battery" of the present teaching. That is, the "lithium-ion secondary battery" of the present teaching may be either a cell or a module. The cell 1 is not provided with a current interrupting device (CID). The protection circuit 10, which is able to suppress a progress of overdischarging, is suitable for use with the lithium-ion secondary battery (the cell 1 or the module 2) provided with no current interrupting device. Here, it should be noted that the lithium-ion secondary battery may be provided with a current interrupting device. The cell 1 is of laminate type. The laminate type cell 1 is normally not provided with a current interrupting device. The protection circuit 10 is suitable for use with the laminate type cell 1 or with the module 2 including the laminate type cell 1. Here, it should be noted that the cell of the present teaching may be of can type, and the can type cell may have either a cylindrical shape or a square shape.

The protection circuit 10 includes a controlling IC 3 and an interrupting circuit 12.

The controlling IC 3 has a power supply input terminal Vcc connected to a battery line BL, and a ground terminal GND connected to a ground line GL. In the present specification and claims, the term "battery line" (BL) refers to an electrical line or conductor connected to one end of a battery module 2, and the term "ground line" (GL) refers to an electrical line or conductor connected to the opposite end of the battery module 2. The controlling IC 3 is driven by electric power of the module 2. The electric power of the module 2 is supplied from the positive electrode side (+) of the module 2 to the power supply input terminal Vcc. The controlling IC 3 receives a voltage detection signal outputted from a voltage detection circuit 7. The voltage detection circuit 7 of this embodiment is a line that supplies a voltage of the battery line BL to the controlling IC 3. The voltage detection signal is inputted to a voltage detection terminal V of the controlling IC 3. The controlling IC 3 uses the voltage detection signal to measure a voltage of the module 2. The controlling IC 3 receives a current detection signal outputted from a current detection circuit 8. The current detection signal is inputted to a current detection terminal I of the controlling IC 3. The controlling IC 3 uses the current detection signal to measure a current of the module 2. The controlling IC 3 receives a temperature detection signal outputted from a temperature detection circuit 9. The temperature detection signal is inputted to a temperature detection terminal T of the controlling IC 3. The controlling IC 3 uses the temperature detection signal to measure a temperature of the module 2.

The controlling IC 3 outputs to a switch 5 a drive signal for driving the switch 5. The switch 5 is provided in the battery line BL between the positive electrode side (+) of the module 2 and the positive terminal 10a. The drive signal is outputted from a charging/discharging control terminal CHG/DCG of the controlling IC 3. The switch 5 is a normally-off element, which is an element configured to be turned off when no drive signal is inputted. The switch 5 is able to electrically connect and disconnect the battery pack 11 to and from the outside. The switch 5 is an element whose current capacity is sufficiently higher than a maximum value of a current in charging or discharging the battery pack 11.

The controlling IC 3 is configured to detect an abnormality of the module 2 based on the detected voltage, current, and temperature. If an abnormality is detected by the controlling IC 3, a power fail signal outputted from the controlling IC 3 drives a switch 6. The power fail signal is outputted from a power fail terminal PF of the controlling IC 3. Abnormalities of the battery pack 11 detected by the controlling IC 3 include at least an overdischarge state. In addition, the controlling IC 3 may detect, for example, an overcharge state.

The interrupting circuit 12 includes a fuse 4 and the switch 6.

The fuse 4 is provided between the battery line BL and the controlling IC 3. The fuse 4 is a non-return type element.

When the fuse 4 is not blown, the electric power of the module 2 is supplied to the controlling IC 3 through the fuse 4. When the fuse 4 is blown, the electric power supply from the module 2 to the controlling IC 3 is blocked.

The switch 6 electrically connects a node N1 of the fuse 4 and the controlling IC 3 to the ground line GL. If no abnormality of the module 2 is detected (that is, in a normal state), the switch 6 is off. While the switch 6 is off, a current flows from the module 2 to the controlling IC 3 through the fuse 4. The current flowing through the fuse 4 at this time is too small to blow the fuse 4. The switch 6 is turned on based on the power fail signal which is outputted from the controlling IC 3 if an abnormality of the module 2 is detected. While the switch 6 is on, a current flows from the module 2 to the ground line GL through the fuse 4 and the switch 6, to cause a short circuit. Thus, the current flowing through the fuse 4 is large enough to blow the fuse 4. That is, the switch 6 is arranged so as to allow a current capable of blowing the fuse 4 to flow from the module 2 to the fuse 4 when the switch 6 is turned on.

The protection circuit 10 includes the voltage detection circuit 7, the current detection circuit 8, and the temperature detection circuit 9. The present teaching is not limited to this example. The current detection circuit 8 and the temperature detection circuit 9 may not be indispensable. The same is true for other embodiments.

In the protection circuit 10, if the controlling IC 3 detects an abnormality, the controlling IC 3 outputs a power fail signal to the switch 6. The switch 6 is turned on accordingly. As a result, the fuse 4 is blown. The electric power supply from the module 2 to the controlling IC 3 is blocked. A progress of overdischarging, which is due to a dark current of the controlling IC, can be suppressed. Since the controlling IC 3 stops, the output of the drive signal from the controlling IC to the switch 5 stops. As a result, the switch 5 is turned off. The battery pack 11 is electrically disconnected from the outside. This makes the battery pack 11 unusable.

Some of conventional battery packs are configured as follows. In such a conventional battery pack, if a controlling IC detects an abnormality, the controlling IC stops outputting a drive signal to a switch (a switch corresponding to the switch 5) provided in a battery line, to block the switch. In this configuration, there may be a likelihood that the controlling IC outputs a drive signal to the switch to turn on the switch when, for example, an abnormal state of a module is removed as a result of the switch being turned off or the controlling IC is reset either naturally or artificially. This may bring the battery pack into a usable state though the battery pack is in fact under a situation where it should not be used.

In this respect, the protection circuit 10 is advantageous in that use of the battery pack 11 can be stopped reliably, because if the controlling IC 3 detects an abnormality, the switch 6 is turned off to blow the fuse 4 which is a non-return type element, so that the controlling IC 3 is turned off.

First Embodiment

Figure 2:
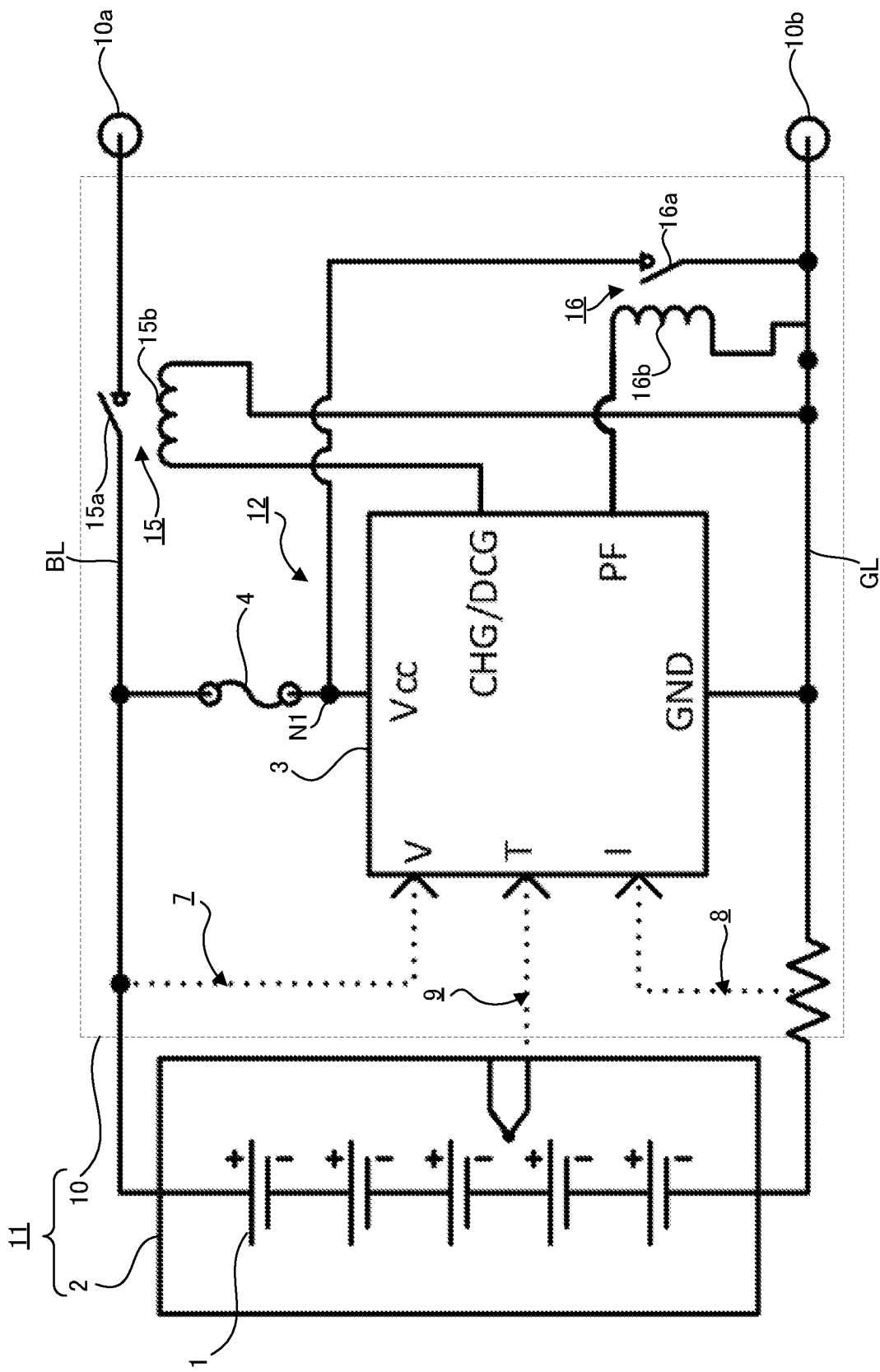
FIG. 2 A circuit diagram schematically showing a protection circuit according to a first embodiment of the teaching of the present application.

FIG. 2 is a circuit diagram schematically showing a protection circuit according to a first embodiment of the teaching of the present application. In FIG. 2, elements identical to the elements shown in FIG. 1 are given the same reference signs as the reference signs shown in FIG. 1. The elements identical to the elements shown in FIG. 1 are already described, and therefore their descriptions will be omitted.

A protection circuit 10 of the first embodiment includes relays 15, 16 as one example of the switches 5, 6 shown in FIG. 1. The relays 15, 16 are DC relays. The relays 15, 16 are elements which can be turned on/off by an external voltage. The relays 15, 16 are configured such that contacts 15a, 16a are opened and closed by electromagnets 15b, 16b. On/off of the electromagnet 15b is controlled by a drive signal outputted from a charging/discharging control terminal CHG/DCG of a controlling IC 3. On/off of the electromagnet 16b is controlled by a power fail signal outputted from a power fail terminal PF of the controlling IC 3. The relays 15, 16 are normally off.

In the protection circuit 10 of the first embodiment, if the controlling IC 3 detects an abnormality, the relay 16 is turned on, to blow a fuse 4 which is a non-return type element. As a result, the controlling IC 3 is turned off, and thus use of the battery pack 11 can be stopped reliably.

Second Embodiment

Figure 3:
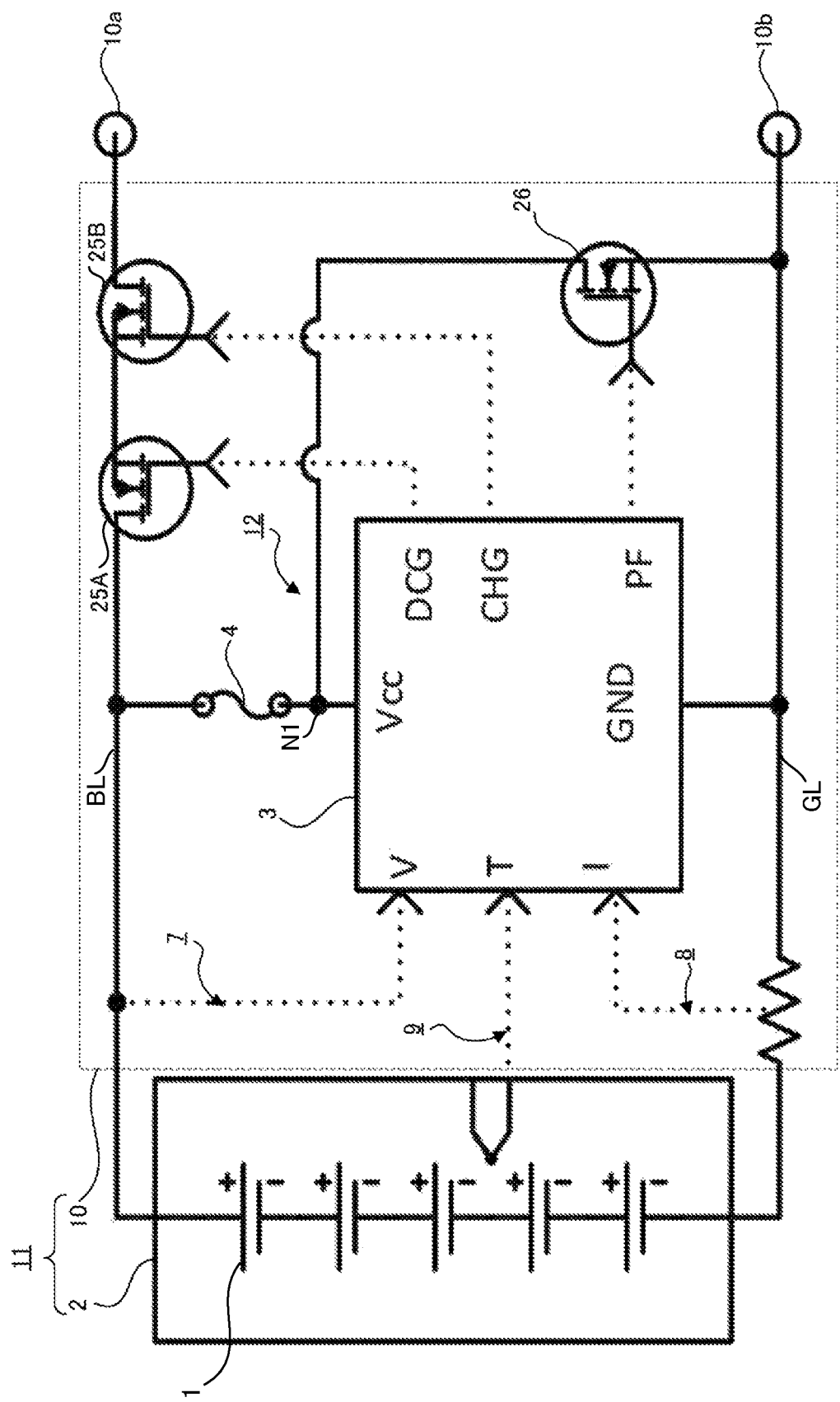
FIG. 3 A circuit diagram schematically showing a protection circuit according to a second embodiment of the teaching of the present application.

FIG. 3 is a circuit diagram schematically showing a protection circuit according to a second embodiment of the teaching of the present application. In FIG. 3, elements identical to the elements shown in FIG. 1 are given the same reference signs as the reference signs shown in FIG. 1. The elements identical to the elements shown in FIG. 1 are already described, and therefore their descriptions will be omitted.

A protection circuit 10 of the second embodiment includes FETs 25A, 25B as one example of the switch 5 shown in FIG. 1, and an FET 26 as one example of the switch 6 shown in FIG. 1. The FETs 25A, 25B, 26 are MOSFETs. A controlling IC 3 has a charging control terminal CHG and a discharging control terminal DCG. On/off of the FET 25A is controlled by a drive signal outputted from the discharging control terminal DCG of the controlling IC 3. On/off of the FET 25B is controlled by a drive signal outputted from the charging control terminal CHG of the controlling IC 3. On/off of the FET 26 is controlled by a power fail signal outputted from a power fail terminal PF of the controlling IC 3. The FETs 25A, 25B, 26 are normally off.

In the protection circuit 10 of the second embodiment, if the controlling IC 3 detects an abnormality, the FET 26 is turned on, to blow a fuse 4 which is a non-return type element. As a result, the controlling IC 3 is turned off, and thus use of a battery pack 11 can be stopped reliably. Here, transistors (for example, bipolar transistors) other than FETs may be provided instead of the FETs. Adoption of semiconductor elements such as FETs as the switches can provide a battery pack 11 having a prolonged lifetime.

Third Embodiment

Figure 4:
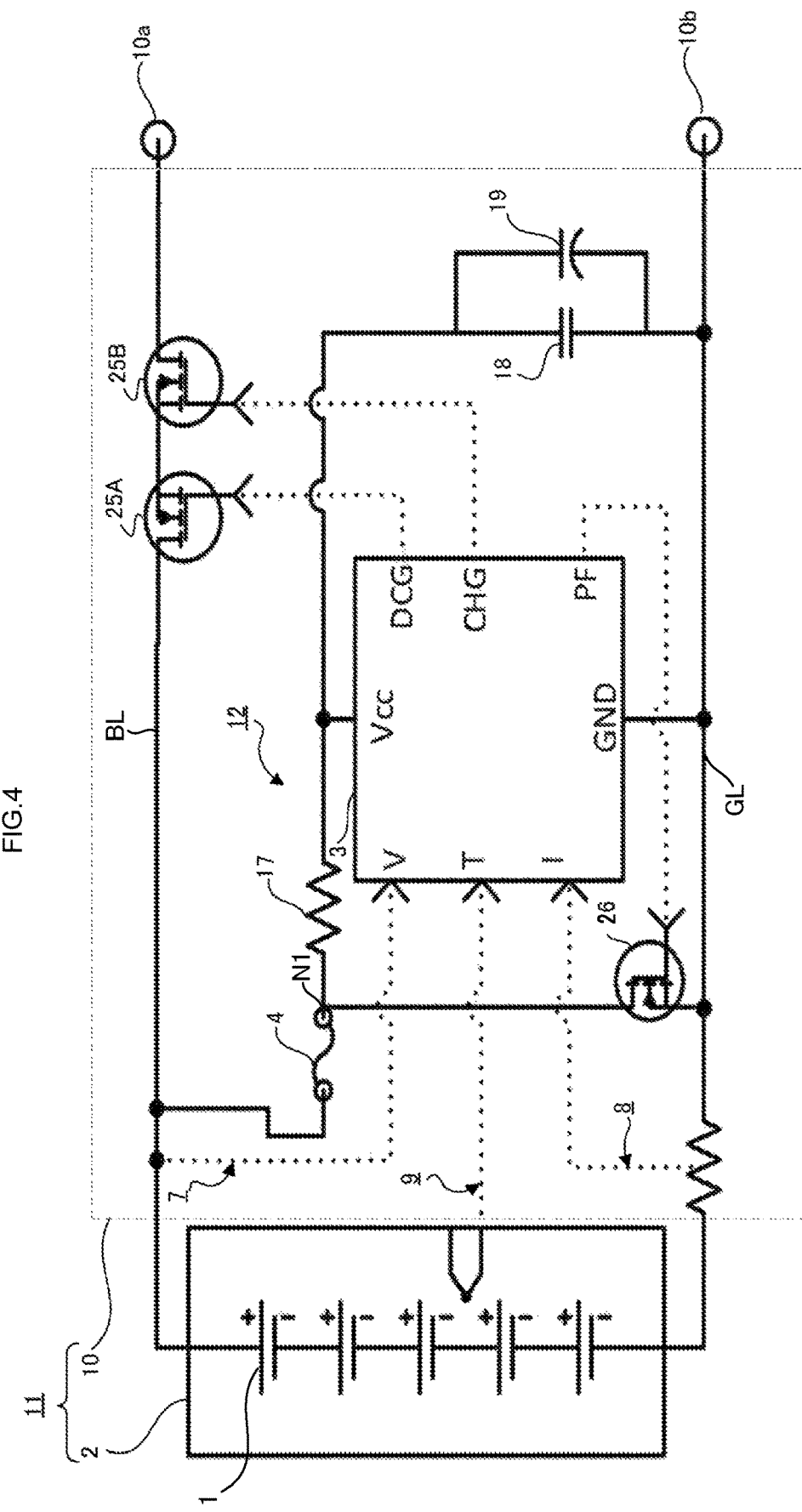
FIG. 4 A circuit diagram schematically showing a protection circuit according to a third embodiment of the teaching of the present application.

FIG. 4 is a circuit diagram schematically showing a protection circuit according to a third embodiment of the teaching of the present application. In FIG. 4, elements identical to the elements shown in FIG. 3 are given the same reference signs as the reference signs shown in FIG. 3. The elements identical to the elements shown in FIG. 3 are already described, and therefore their descriptions will be omitted.

In a protection circuit 10 of the third embodiment, an interrupting circuit 12 includes capacitors 18, 19. The capacitor 18 serving as a bypass capacitor is provided for the purpose of stable operation of the protection circuit 10. The capacitor 18 is arranged between a power supply input terminal Vcc of a controlling IC 3 and a ground line GL. The capacitor 19 is, for example, a polar capacitor. The capacitor 19 is configured to transiently supply electric power to the controlling IC 3 after a fuse 4 is blown, which configuration allows the controlling IC 3 to ensure a processing time after an operation (fuse blowing) is performed upon detection of an abnormality. In this processing time, the controlling IC 3 can, for example, send a signal indicating occurrence of the abnormality to the outside. The capacitor 19 is one example of the "capacitor" of the present teaching. The "capacitor" of the present teaching may serve a function of the capacitor 18 as well as a function of the capacitor 19. In other words, the capacitors 18, 19 may either be separate elements as illustrated in this embodiment or be formed of a single element.

In the protection circuit 10 of the third embodiment, the interrupting circuit 12 includes a resistance 17 arranged in series with the fuse 4. The resistance 17 serving as a current limiting resistance is provided so as to make an inrush current to the capacitor 18 or the capacitor 19 equal to or less than a current blowing the fuse 4 when a module 2 is connected to the protection circuit 10 in a manufacturing process of a battery pack 11, for example. The resistance 17 prevents the fuse 4 from being blown by the capacitor 18 or the capacitor 19. The resistance 17 is arranged between the controlling IC 3 and a node N1 of the fuse 4, the controlling IC 3, and an FET 26. Thus, the FET 26 is connected between the fuse 4 and the resistance 17. The resistance 17 is arranged such that the resistance 17 is closer to the controlling IC 3 than the fuse 4 is. In a region from the module 2 to the controlling IC 3, the fuse 4, the node N1, and the resistance 17 are arranged in this sequence. Accordingly, a large current flows in the fuse 4 when the FET 26 is turned on to cause a short circuit, and therefore the fuse 4 can be blown with an enhanced reliability.

In the protection circuit 10 of the third embodiment, moreover, even when the FET 26 transiently remains conducting after the fuse 4 is blown, the resistance 17 serves as a resistance to discharging of the capacitor 19, to limit the discharging of the capacitor 19. A time required for the discharging of the capacitor 19 is prolonged. The controlling IC 3 can more reliably ensure a processing time after an operation (fuse blowing) upon detection of an abnormality.

Fourth Embodiment

Figure 5:
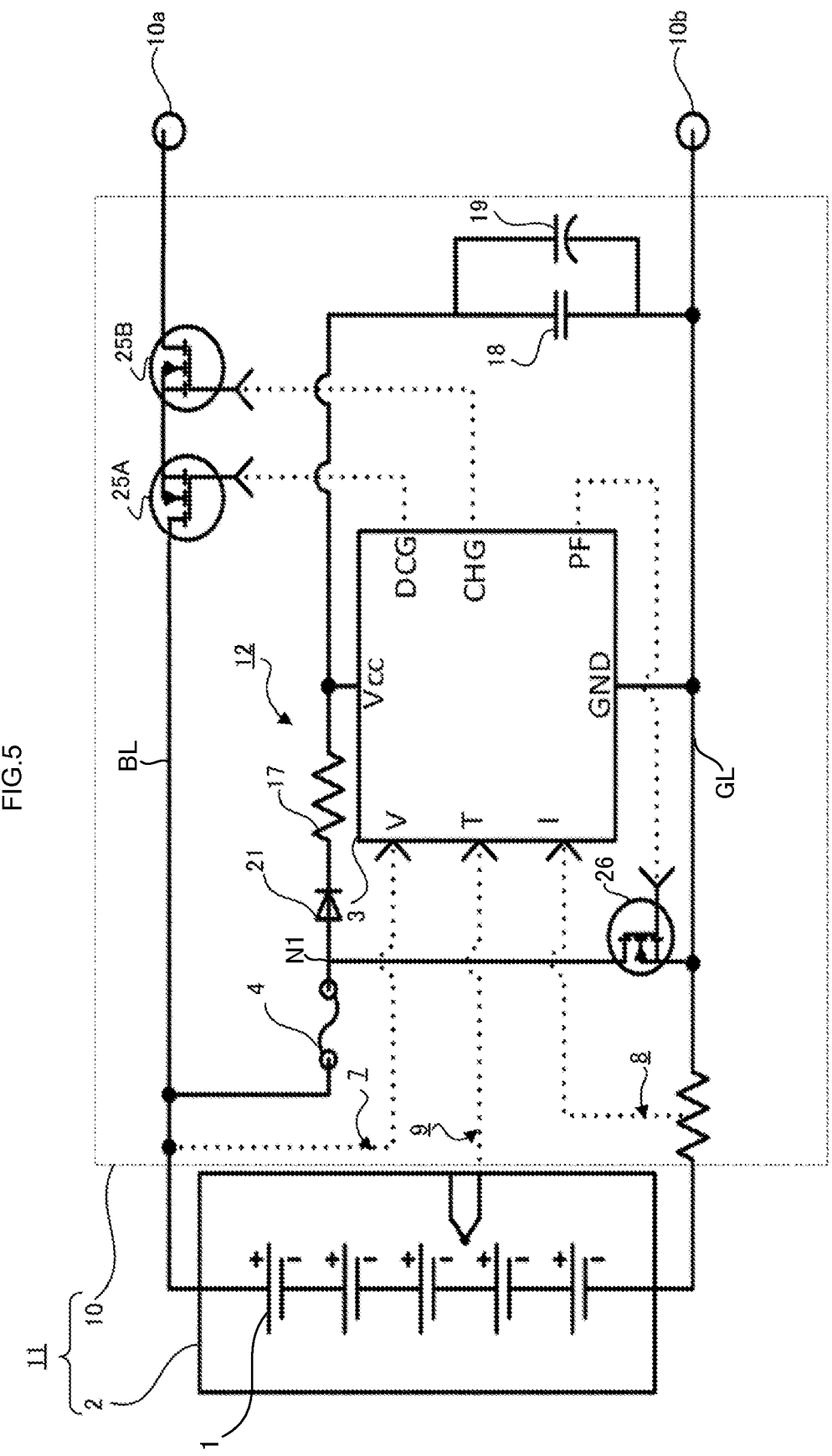
FIG. 5 A circuit diagram schematically showing a protection circuit according to a fourth embodiment of the teaching of the present application.

FIG. 5 is a circuit diagram schematically showing a protection circuit according to a fourth embodiment of the teaching of the present application. In FIG. 5, elements identical to the elements shown in FIG. 4 are given the same reference signs as the reference signs shown in FIG. 4. The elements identical to the elements shown in FIG. 4 are already described, and therefore their descriptions will be omitted.

In a protection circuit 10 of the fourth embodiment, an interrupting circuit 12 includes a diode 21 provided between a fuse 4 and a resistance 17 which are arranged in series with each other. The diode 21 allows a current to flow from the module 2 side to the controlling IC 3 side, and does not allow a current to flow from the controlling IC 3 side to the module 2 side. The diode 21 does not allow a current to flow from a capacitor 19 to an FET 26.

To be more specific, the diode 21 is arranged between the resistance 17 and a node N1 of the fuse 4, the resistance 17, and the FET 26. The diode 21 allows a current to flow from the node N1 side to the resistance 17 side, and does not allow a current to flow from the resistance 17 side to the node N1 side.

The protection circuit 10 of the fourth embodiment, which has the diode 21 provided between the fuse 4 and the resistance 17, is able to prevent the electric charge of the capacitor 19 from being discharged through the FET 26. Accordingly, the controlling IC 3 can further reliably ensure a processing time after an operation (fuse blowing) is performed upon detection of an abnormality.

Fifth Embodiment

Figure 6:
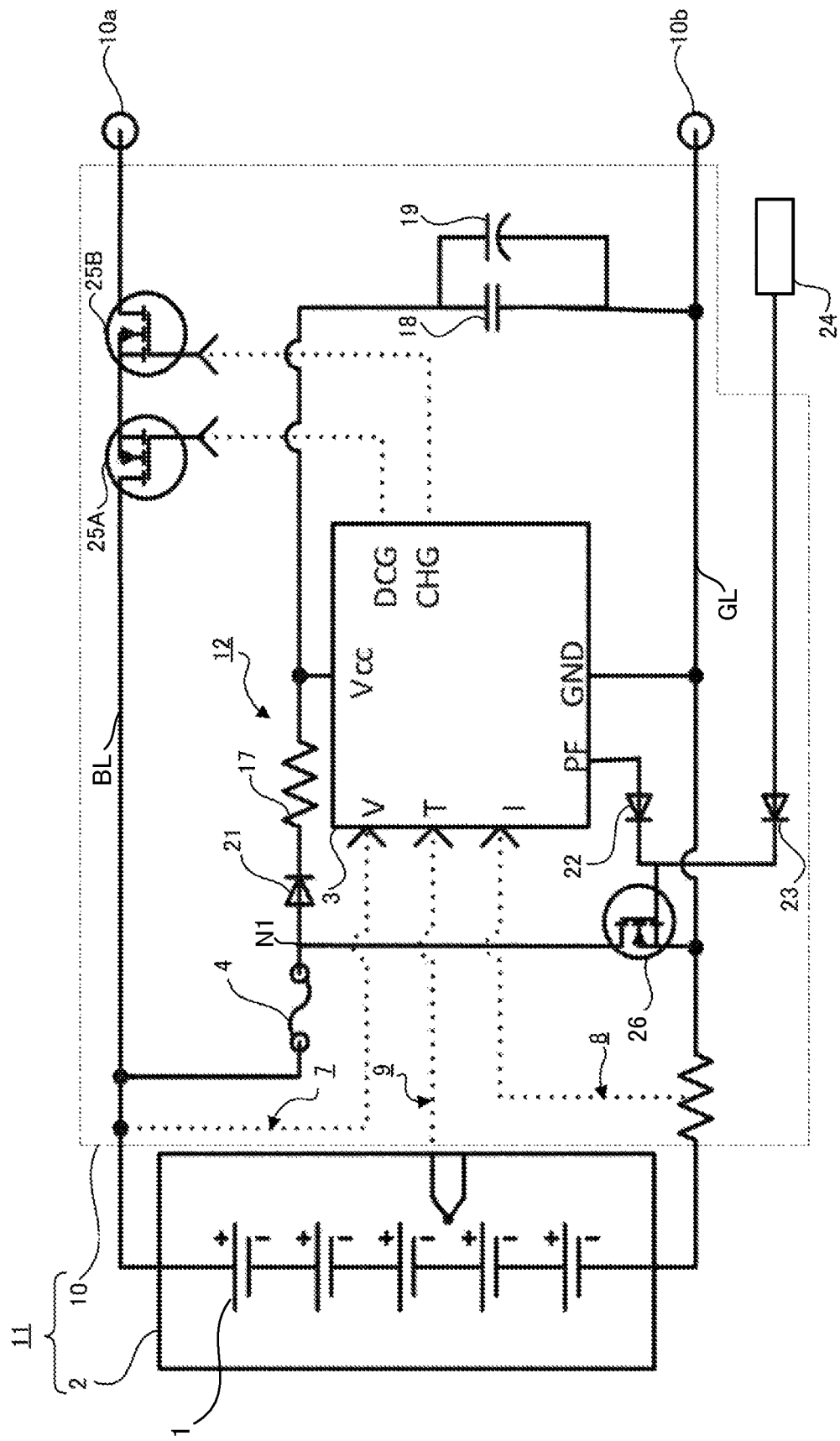
FIG. 6 A circuit diagram schematically showing a protection circuit according to a fifth embodiment of the teaching of the present application.

FIG. 6 is a circuit diagram schematically showing a protection circuit according to a fifth embodiment of the teaching of the present application. In FIG. 6, elements identical to the elements shown in FIG. 5 are given the same reference signs as the reference signs shown in FIG. 5. The elements identical to the elements shown in FIG. 5 are already described, and therefore their descriptions will be omitted.

In a protection circuit 10 of the fifth embodiment, a controlling IC 3 is connected to a gate of an FET 26, and the gate of the FET 26 is connected to an external apparatus 24. A power fail terminal PF of the controlling IC 3 is connected to the gate of the FET 26. A diode 22 is provided between the controlling IC 3 and the FET 26. The diode 22 allows a current to flow from the controlling IC 3 side to the FET 26 side, and does not allow a current to flow from the external apparatus 24 side to the controlling IC 3 side. A diode 23 is provided between the controlling IC 3 and the external apparatus 24. The diode 23 allows a current to flow from the external apparatus 24 side to the FET 26 side, and does not allow a current to flow from the controlling IC 3 side to the external apparatus 24 side.

The FET 26 is turned on by a power fail signal outputted from the controlling IC 3, or turned on by an external current supplied from the external apparatus 24. The external apparatus 24 is, for example, an apparatus physically separate from a battery pack 11. The external apparatus 24 is not particularly limited, and examples thereof include a recharger capable of charging the battery pack 11 (module 2) and an apparatus operable with electric power supplied from the battery pack 11. In this embodiment, the external apparatus 24 is configured to detect that the controlling IC 3 becomes inoperable due to hang-up or the like. The external apparatus 24 is configured to supply an external current to the gate of the FET 26 upon detection of inoperability of the controlling IC 3. In the drawing, a line connecting the external apparatus 24 to the controlling IC 3 is not shown. The external apparatus 24 supplies a current to the FET 26 to turn on the FET 26 when, for example, communication with the controlling IC 3 is disabled. The external apparatus 24 may supply a current to the FET 26 to turn on the FET 26 based on a signal outputted from the controlling IC 3. In other words, the controlling IC 3 indirectly turns on the FET 26 via the external apparatus 24. In this manner, the FET 26 may be directly or indirectly turned on by the controlling IC 3.

In this embodiment, even when the controlling IC 3 becomes inoperable, the FET 26 is turned on with the external current, so that a fuse 4 which is a non-return type element is blown. That is, a voltage applied to a power supply input terminal Vcc of the controlling IC 3 is blocked. As a result, a drive voltage of the FET 26 disappears, so that the FET 26 is turned off. Accordingly, the battery pack 11 is disconnected from the outside.

Sixth Embodiment

Figure 7:
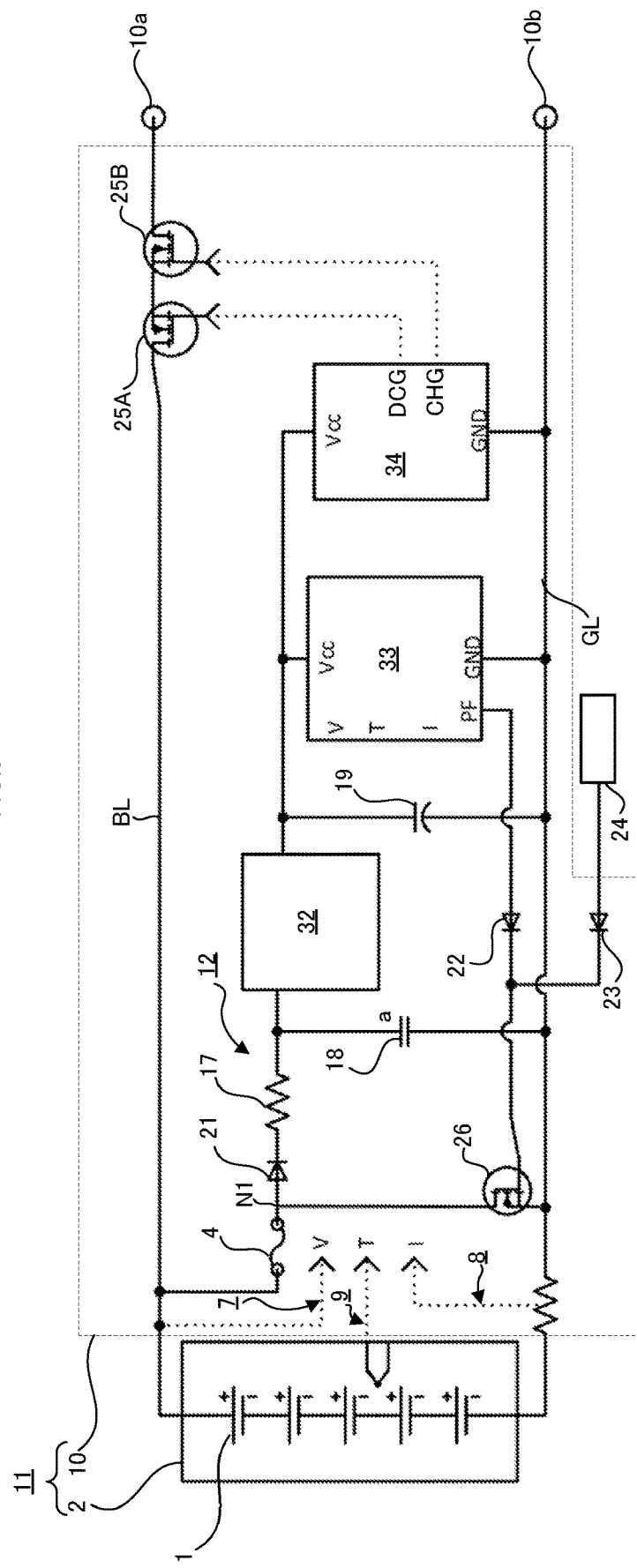
FIG. 7 A circuit diagram schematically showing a protection circuit according to a sixth embodiment of the teaching of the present application.

FIG. 7 is a circuit diagram schematically showing a protection circuit according to a sixth embodiment of the teaching of the present application. In FIG. 7, elements identical to the elements shown in FIG. 6 are given the same reference signs as the reference signs shown in FIG. 6. The elements identical to the elements shown in FIG. 6 are already described, and therefore their descriptions will be omitted.

A protection circuit 10 of the sixth embodiment includes a microprocessor (MPU) or the like, instead of the controlling IC 3 shown in FIG. 1 to FIG. 6. A voltage for operating a microprocessor 33 is, for example, 1.8 to 5.5V. The voltage for operating the microprocessor 33 is lower than a voltage of a module 2. This is why a sub power source 32 is provided between a battery line BL and a power supply input terminal Vcc of the microprocessor 33. The sub power source 32 is configured to convert the voltage of the module 2 into a voltage of the microprocessor 33. A fuse 4 is provided between the battery line BL and the sub power source 32. The fuse 4, a diode 21, and a resistance 17 are arranged in series between the battery line BL and the sub power source 32. In a region from a module 2 to the sub power source 32, the fuse 4, the diode 21, and the resistance 17 are arranged in this sequence. Accordingly, a large current flows in the fuse 4 when an FET 26 is turned on to cause a short circuit, and therefore the fuse 4 can be blown with an enhanced reliability.

The microprocessor 33 has a voltage detection terminal V, a current detection terminal I, and a temperature detection terminal T. In the drawing, broken lines indicating a voltage detection signal inputted from a voltage detection circuit 7 to the voltage detection terminal V, a current detection signal inputted from a current detection circuit 8 to the current detection terminal I, and a temperature detection signal inputted from a temperature detection circuit 9 to the temperature detection terminal T are partially omitted.

A capacitor 18 is arranged between the input side of the sub power source 32 and a ground line GL. A capacitor 19 is arranged between the output side of the sub power source 32 and the ground line GL.

The diode 21 is arranged between the resistance 17 and a node N1 of the fuse 4 and the FET 26. The diode 21 is an element for preventing electric charge charged in the capacitor 18 from being discharged through the FET 26 which is turned on when an abnormality occurs. In a case where a processing time is not required after an operation (fuse blowing) is performed upon detection of an abnormality, the diode 21 may be short-circuited. This can shorten a time from when the operation is performed upon detection of an abnormality to when the protection circuit 10 stops operating.

The protection circuit 10 of the sixth embodiment includes an FET drive circuit 34 in addition to the microprocessor 33. The FET drive circuit 34 is a circuit for driving FETs 25A, 25B that disconnect a battery pack 11 from the outside. The FET drive circuit 34 has a charging control terminal CHG and a discharging control terminal DCG. Electric power for driving the FET drive circuit 34 is supplied from the sub power source 32. If electric power supply to the sub power source 32 stops due to blowing of the fuse 4, electric power supply to the FET drive circuit 34 stops. This makes the battery pack 11 unstartable.

The protection circuit 10 may include the sub power source 32, the microprocessor 33, and the FET drive circuit 34 instead of the controlling IC 3, as illustrated in the sixth embodiment. That is, the controlling IC does not always need to be made of a physically single element, but may be composed of a plurality of elements.

Next, referring to FIG. 8, one example of the protection circuit 10 of the battery pack 11 (lithium ion battery pack) connected to a recharger 90 will be described.

Figure 8:
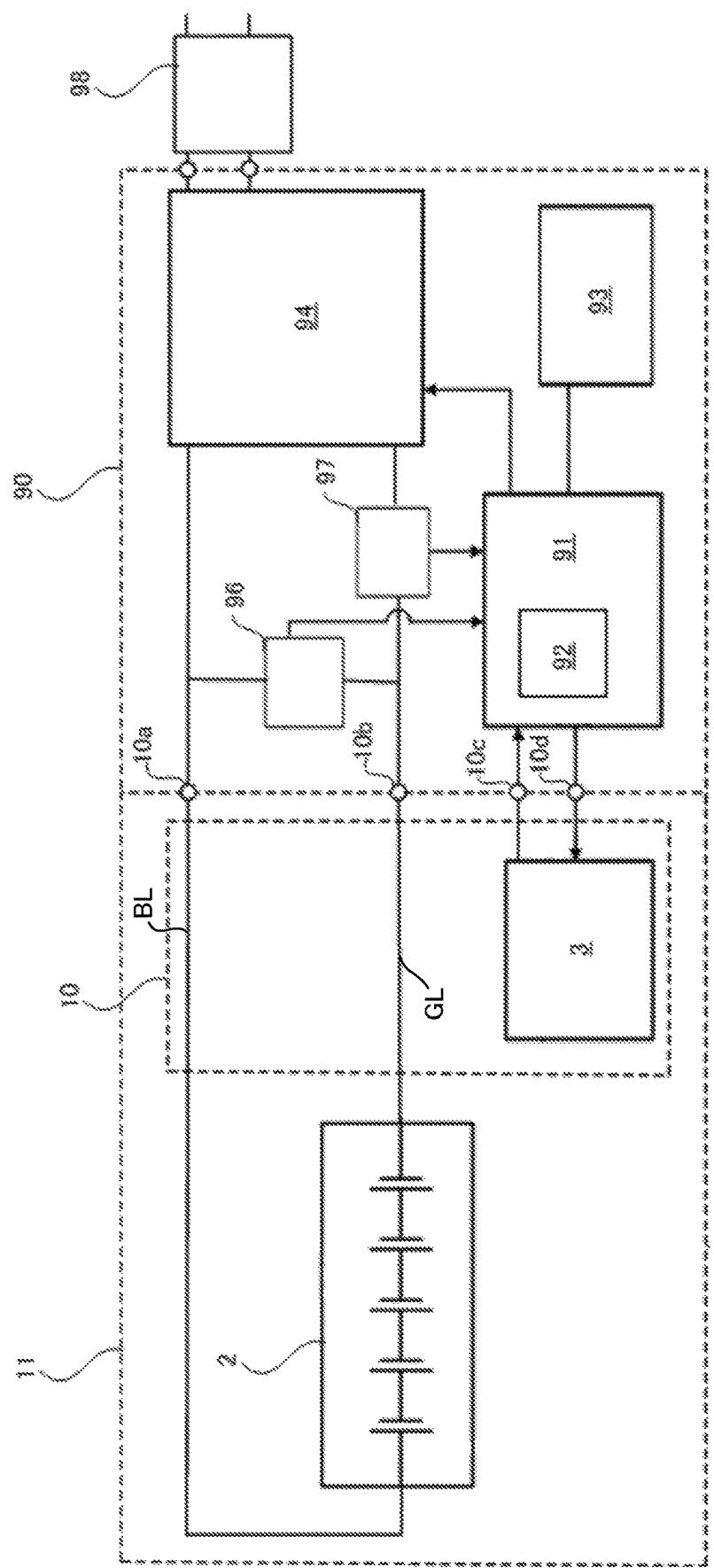
FIG. 8 A circuit diagram schematically showing an example of a protection circuit of a lithium-ion secondary battery according to the teaching of the present application, as connected to a recharger.
Figure 9:
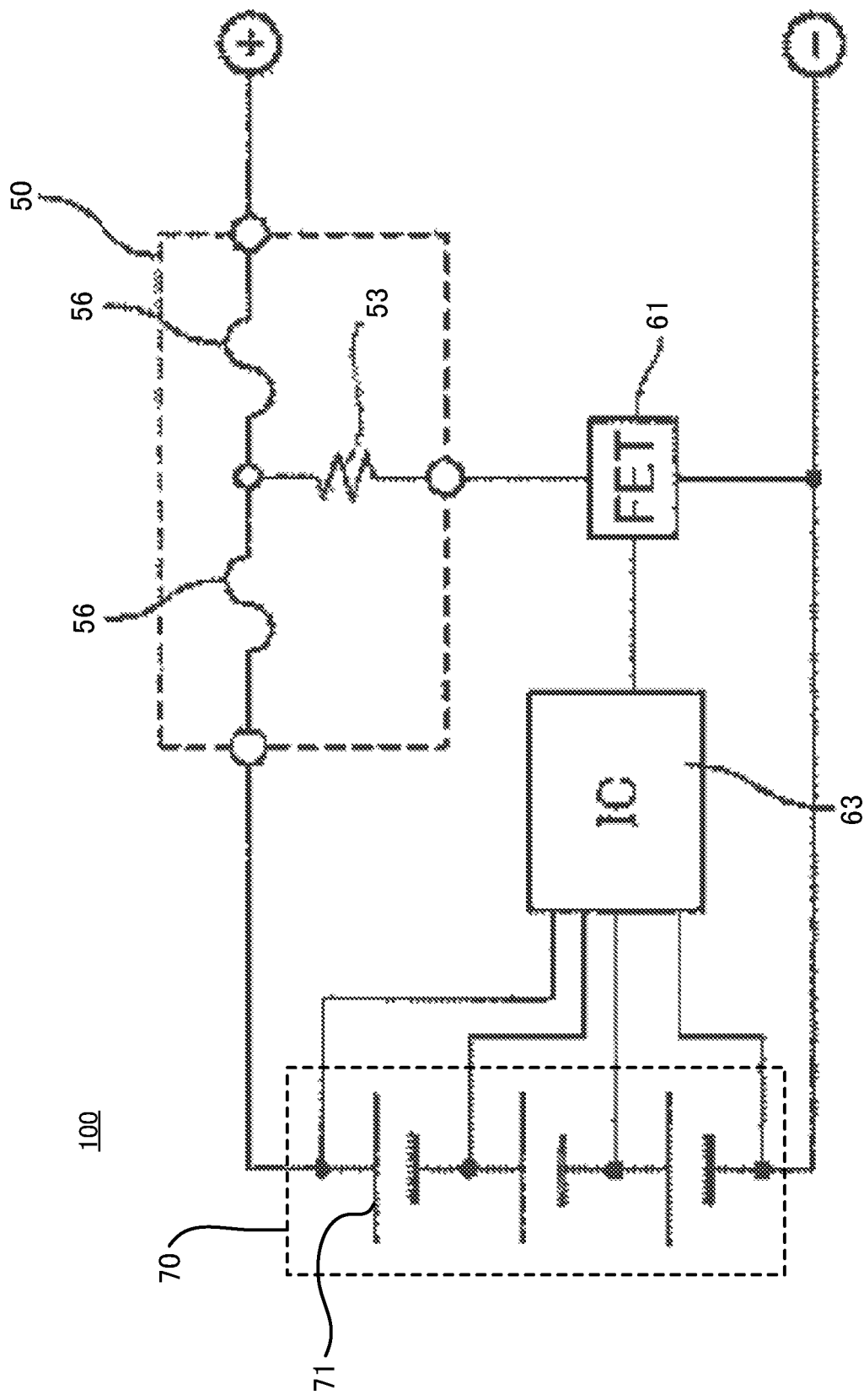
FIG. 9 A circuit diagram schematically showing an example of a conventional protection circuit.

FIG. 8 is a circuit diagram schematically showing one example of the protection circuit 10 of the battery pack 11 connected to the recharger 90. The configuration of the protection circuit 10 is omitted in FIG. 8 because the protection circuit 10 is already described with reference to FIG. 1 to FIG. 7. As the protection circuit 10 illustrated in FIG. 8, for example, the protection circuits 10 having the configurations shown in FIG. 1 to FIG. 7 are adoptable. In a case of adopting the protection circuit 10 having the configuration of FIG. 7, the controlling IC 3 shown in FIG. 8 is replaced with the sub power source 32, the microprocessor 33, and the FET drive circuit 34 shown in FIG. 7, and the microprocessor 33 is configured to communicate with a communication unit 92 which will be described later.

In a case of connecting the battery pack 11 to the recharger 90, the positive terminal 10a and the negative terminal 10b of the battery pack 11 are connected to the recharger 90. Moreover, communicating terminals 10c, 10d of the controlling IC 3 are connected to the recharger 90. The recharger 90 includes a control unit 91. The control unit 91 is connected to a detection unit (not shown) that detects connection of the battery pack 11. The control unit 91 includes the communication unit 92. The communication unit 92 is able to communicate with the controlling IC 3 through the communicating terminals 10c, 10d while the battery pack 11 is connected to the recharger 90. The communication may be either wired or wireless. The positive terminal 10a and the negative terminal 10b of the battery pack 11 are connected to an AC/DC converter 94 included in the recharger 90. The AC/DC converter 94 is connected to an external power supply terminal 98. The external power supply terminal 98 is connected to an external power source (not shown) having a single-phase alternating current, for example. The control unit 91 is connected to a voltage detection unit 96 and a current detection unit 97, and configured to control the AC/DC converter 94 based on detection results. The control unit 91 is connected to an output unit 93. The output unit 93 is composed of, for example, a light source such as an LED and a light source driver. The output unit 93 is controlled by the control unit 91. The output unit 93 is configured to perform an output informing that the battery pack 11 has reached the overcharge state or the overdischarge state based on a communication result between the controlling IC 3 and the communication unit 92. The output is, for example, lighting of the light source. The output performed by the output unit 93 is not particularly limited so long as it is performed in a user-recognizable manner. Examples of audibly recognizable outputs include outputting a notification sound and outputting a voice sound. Examples of visually recognizable outputs include not only lighting the light source as mentioned above but also blinking the light source and displaying information indicative of occurrence of an abnormality. An output using vibrations is also acceptable.

In the protection circuit 10, while the fuse 4 is blown so that electric power supply to the controlling IC 3 is stopped, the communication unit 92 cannot communicate with the controlling IC 3 even though the battery pack 11 is connected to the recharger 90. That is, the communication results in a failure. The control unit 91 controls the output unit 93 based on the communication result. The output unit 93 lights the light source based on the communication result. The lighting of the light source is one example of the output for informing that the battery pack 11 has reached the overcharge state or the overdischarge state.

As thus far described, the protection circuit 10 according to each of the aspects of FIG. 1 to FIG. 8 includes the controlling IC 3 (or the microprocessor 33, the sub power source 32, and the FET drive circuit 34), and the interrupting circuit 12. The controlling IC 3 is driven by electric power of the module 2. The controlling IC 3 is configured to detect at least a voltage of the module 2. The interrupting circuit 12 includes at least the fuse 4 and the switch 6 (for example, the relay 16, the FET 26). The fuse 4 is provided between the module 2 and the controlling IC 3. The switch 6 is arranged so as to allow a current capable of blowing the fuse 4 to flow from the module 2 to the fuse 4 when the switch 6 is turned on. In the protection circuit 10, therefore, if an abnormality such as overdischarging occurs in the module 2, the switch 6 is turned on so that a current having a magnitude capable of blowing the fuse 4 flows from the module 2 to the fuse 4. As a result, the fuse 4 is blown, and thus current consumption of the controlling IC 3 stops. Accordingly, when overdischarging is reached, any more progress of the overdischarging can be suppressed. In addition, the protection circuit 10, in which a versatile component with a low current consumption is adoptable as the fuse 4 and the switch 6, can suppress a progress of the overdischarging at low costs. Here, the switch 6 may be the relay 16, or may be the FET 26.

Preferably, the interrupting circuit 12 includes the resistance 17 arranged in series with the fuse 4, as in the protection circuit 10 according to each of the aspects of FIG. 4 to FIG. 8. The resistance 17 can adjust the magnitude of a current flowing in the fuse 4. Thus, a situation in which the fuse 4 is blown by the inrush current can be suppressed. In addition, the fuse 4 can be easily blown by a current that flows in the fuse 4 when the switch 6 is turned on.

Preferably, the resistance 17 is arranged such that the resistance 17 is closer to the controlling IC 3 than the fuse 4 is, as in the protection circuit 10 according to each of the aspects of FIG. 4 to FIG. 8. The current that flows in the fuse 4 when the switch 6 is turned on can be increased. The fuse 4 is blown with an enhanced reliability.

Preferably, the interrupting circuit 12 includes the capacitor 19, as in the protection circuit 10 according to each of the aspects of FIG. 4 to FIG. 8. After the fuse 4 is blown, a current is transiently supplied from the capacitor 19 to the controlling IC 3. This allows the controlling IC 3 to ensure a processing time after the operation (blowing of the fuse 4) is performed upon detection of an abnormality. In this processing time, the controlling IC 3 can, for example, send a signal indicating occurrence of the abnormality to the outside.

Preferably, the protection circuit 10 is configured to control the recharger 90 charging the module 2, and the recharger 90 is configured to perform an output for informing that the module 2 has reached the overcharge state or the overdischarge state, as illustrated in the aspect of FIG. 8. This enables the user to recognize the overcharge state or the overdischarge state of the battery pack 11 by using the battery pack 11 in combination with the recharger 90.

Preferably, the controlling IC 3 is configured to communicate with the recharger 90, and the recharger 90 includes the communication unit 92 and the output unit 93, the communication unit 92 being configured to communicate with the controlling IC 3, the output unit 93 being configured to perform an output for informing that the battery pack 11 has reached the overcharge state or the overdischarge state based on a result of communication between the controlling IC 3 and the communication unit 92, as illustrated in the aspect of FIG. 8. This enables the user to recognize the overcharge state or the overdischarge state of the battery pack 11 by using the battery pack 11 in combination with the recharger 90.

Preferably, the interrupting circuit 12 is configured to blow the fuse 4 arranged between the controlling IC 3 and the module 2 having no current interrupting device, as in the protection circuit 10 according to each of the aspects of FIG. 1 to FIG. 8. The current interrupting device is a device configured to, for example mechanically, block a current path when an internal pressure of the cell 1 included in the module 2 rises. In the cell 1 having no current interrupting device, even when the internal pressure rises due to overdischarging, the current path is not blocked, which causes a risk that the overdischarging may progress. In this respect, the protection circuit 10 suppresses a progress of overdischarging because the fuse 4 is blown. In other words, the protection circuit 10 is adoptable suitably for use with a lithium-ion secondary battery having no current interrupting device.

The battery pack 11 according to each of the aspects of FIG. 1 to FIG. 8 includes the module 2 and the protection circuit 10. When reaching overdischarging, the battery pack 11 can suppress any more progress of the overdischarging, while adopting a versatile and low-cost element. It may be acceptable that the battery pack 11 (lithium-ion secondary battery pack) cooperates with the recharger 90 to form a lithium-ion secondary battery set.

The embodiments and variations can be combined as appropriate. It should be understood that the terms and expressions used herein are for descriptions and not to be construed in a limited manner, do not eliminate any equivalents of features shown and mentioned herein, and allow various modifications falling within the claimed scope of the present teaching. The present teaching may be embodied in many different forms. The present disclosure is to be considered as providing embodiments of the principles of the present teaching. The embodiments are described herein with the understanding that such embodiments are not intended to limit the present teaching to preferred embodiments described herein and/or illustrated herein. The embodiments described herein are not limiting. The present teaching includes any and all embodiments having equivalent elements, modifications, omissions, combinations, adaptations and/or alterations as would be appreciated by those in the art based on the present disclosure. The limitations in the claims are to be interpreted broadly based on the language employed in the claims and not limited to embodiments described herein or during the prosecution of the present application.

REFERENCE SIGNS LIST 1 cell (lithium-ion secondary battery cell)
2 module (lithium-ion secondary battery module)
3 controlling IC
4 fuse
5, 6 switch
7 voltage detection circuit
8 current detection circuit
9 temperature detection circuit
10 protection circuit
10a positive terminal
10b negative terminal
11 battery pack (lithium-ion secondary battery pack)
12 interrupting circuit 15, 16 relay
17 resistance
18, 19 capacitor
21, 22, 23 diode
24 external apparatus
25A, 25B, 26 FET
32 sub power source
33 microprocessor
34 FET drive circuit

The invention claimed is:

1. A protection circuit of a lithium-ion secondary battery, the protection circuit of the lithium-ion secondary battery comprising:
   a controlling IC that is driven by electric power of the lithium-ion secondary battery, and configured to detect at least a voltage of the lithium-ion secondary battery, the controlling IC being connected to a line connecting a battery line and a ground line to each other, the controlling IC having a power supply input terminal connected to the battery line and a ground terminal connected to the ground line; and
   an interrupting circuit including at least a fuse and a switch, the fuse being arranged along the line at a location between the battery line and the power supply input terminal, the switch being arranged so as to allow a current that is too small to blow the fuse to flow from the lithium-ion secondary battery to the controlling IC through the fuse when the switch is off, and allow a current capable of blowing the fuse to flow from the lithium-ion secondary battery to the fuse so that the fuse is blown to block electric power supply to the controlling IC when the switch is turned on.

2. The protection circuit of the lithium-ion secondary battery according to claim 1, wherein
   the interrupting circuit includes a resistor arranged in series with the fuse.

3. The protection circuit of the lithium-ion secondary battery according to claim 2, wherein
   the resistor is arranged such that the resistor is closer to the controlling IC than the fuse is.

4. The protection circuit of the lithium-ion secondary battery according to claim 1, wherein
   the interrupting circuit includes a capacitor.

5. The protection circuit of the lithium-ion secondary battery according to claim 1, wherein
   the protection circuit of the lithium-ion secondary battery is configured to control charging performed by a recharger capable of charging the lithium-ion secondary battery, the recharger being configured to generate an output indicating that the lithium-ion secondary battery has reached an overcharge state or an overdischarge state.

6. The protection circuit of the lithium-ion secondary battery according to claim 5, wherein
   the controlling IC is configured to communicate with the recharger, and
   the recharger includes a communication unit and an output unit, the communication unit being configured to communicate with the controlling IC, the output unit being configured to generate the output indicating that the lithium-ion secondary battery has reached the overcharge state or the overdischarge state based on a result of communication between the controlling IC and the communication unit.

7. The protection circuit of the lithium-ion secondary battery according to claim 1, wherein
   the lithium-ion secondary battery does not include a current interrupting device, and
   the interrupting circuit is configured to blow the fuse provided between the controlling IC and the lithium-ion secondary battery that does not include the current interrupting device.

8. A battery pack of a lithium-ion secondary battery, the battery pack of the lithium-ion secondary battery comprising:
   the lithium-ion secondary battery; and
   the protection circuit according to claim 1.

* * * * *